(12) United States Patent
Schulz et al.

(10) Patent No.: US 7,324,761 B2
(45) Date of Patent: Jan. 29, 2008

(54) SINGLE SIDEBAND OPTICAL TRANSMITTER

(75) Inventors: Peter A. Schulz, Harvard, MA (US); Paula J. Donovan, Dedham, MA (US); Scott Henion, Clinton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 548 days.

(21) Appl. No.: 11/038,989

(22) Filed: Jan. 20, 2005

(65) Prior Publication Data

US 2006/0159465 A1 Jul. 20, 2006

(51) Int. Cl.
*H04B 10/04* (2006.01)
*H04B 10/12* (2006.01)
*G02B 26/00* (2006.01)
*G02F 1/00* (2006.01)
*H01S 3/10* (2006.01)

(52) U.S. Cl. .................. 398/185; 398/186; 398/188; 359/237; 372/26; 372/28; 372/29.023

(58) Field of Classification Search ............. 398/185, 398/186, 188; 359/237; 372/28, 26, 29.023
See application file for complete search history.

(56) References Cited

U.S. PATENT DOCUMENTS

| 5,239,401 | A | 8/1993 | Olshansky |
| 5,301,058 | A | 4/1994 | Olshansky |
| 5,325,382 | A | 6/1994 | Emura et al. |
| 5,570,219 | A | 10/1996 | Shibutani et al. |
| 5,880,870 | A | 3/1999 | Sieben et al. |
| 5,999,300 | A | 12/1999 | Davies et al. |
| 6,088,147 | A | 7/2000 | Weber et al. |
| 6,141,141 | A | 10/2000 | Wood |
| 6,459,519 | B1 | 10/2002 | Sasai et al. |
| 6,525,857 | B1 | 2/2003 | Way et al. |
| 6,661,976 | B1 | 12/2003 | Gnauck et al. |
| 6,850,713 | B2 * | 2/2005 | Kikuchi et al. ............ 398/201 |
| 6,970,655 | B2 * | 11/2005 | Ono et al. .................. 398/186 |

OTHER PUBLICATIONS

Vergnol, E. et al.; "Integrated Millimetric Single-Side-Band Lighwave Source System Experiment"; ECOC'98; Sep. 1998; pp. 599-600.

(Continued)

*Primary Examiner*—Jason Chan
*Assistant Examiner*—Nathan Curs
(74) *Attorney, Agent, or Firm*—Guerin & Rodriguez, LLP; William G. Guerin

(57) ABSTRACT

Described are an optical transmitter and a method for generating a single sideband optical signal. The method includes generating a data signal at a first power level and at a second power level with a predetermined ratio being defined between the power levels. The data signal at the first power level is applied to a phase module disposed in a laser cavity of a semiconductor laser to generate a frequency modulated laser signal having a double sideband. The intensity of the frequency modulated laser signal is modulated in response to the data signal at the second power level to yield the single sideband optical signal. Optical transmitters implementing the method have an increased manufacturing yield and reliability, a lower fabrication cost and a decreased size compared to other optical single sideband optical transmitters.

10 Claims, 3 Drawing Sheets

OTHER PUBLICATIONS

Shimotsu, Shinichi et al.; "Development of Optical SSB Modulator"; Technical Report 2001 Papers; pp. 4-7.

Salz, J.; "Spectral Shaping by Simultaneous Amplitude and Frequency Modulation"; The Bell System Technical Journal; Apr. 1980; pp. 557-570.

Sieben, M. et al.; "10Gbit/s Optical Single Sideband System"; Electronics Letters; May 22, 1997; vol. 33, No. 11, pp. 971-973.

Cohen, Stanley A.; "Spectrum Conservation Characteristics of Single Sideband Phase Modulation"; IEE; Conference Publication No. 64; "Signal Processing Methods for Radio Telephony"; pp. 54-58, 1970.

International Search Report for PCT/US05/44350 (3 pgs).

* cited by examiner

SINGLE SIDEBAND OPTICAL TRANSMITTER

GOVERNMENT RIGHTS IN THE INVENTION

This invention was made with United States government support under Contract No. F19628-00-C-0002 awarded by the Defense Advanced Research Project Agency. The government may have certain rights in the invention.

FIELD OF THE INVENTION

The invention relates generally to optical communications. More particularly, the invention relates to single sideband optical transmitters for long distance optical communications.

BACKGROUND OF THE INVENTION

High data rate optical communication systems are subject to the effects of chromatic dispersion. Over long distances, compensation is necessary to support a predetermined bandwidth and bit error rate. Various techniques have been used to reduce the effects of chromatic dispersion. One common technique employs one or more dispersion compensating optical fibers to compensate for the chromatic dispersion resulting from transmission through a communication optical fiber. The length of dispersion compensating optical fibers depends on the length of communication optical fiber between the optical source and the receiver. It can be difficult to upgrade a communications network because of the variety of communication path lengths possible between optical sources and receivers. Moreover, dispersion compensation equipment represents a considerable expense and can result in an optical loss that may not be acceptable for high bit rate systems. However, as metro area networks move to higher data rates (e.g., 10 Gbps or greater), the need to effectively deal with chromatic dispersion has significantly increased.

Single sideband (SSB) transmission is a transmission method in which one of the two modulated sidebands generated on each side of a carrier frequency is suppressed and the other is transmitted. Thus the bandwidth required for data transmission is reduced by approximately one-half. Common to wireless communications, SSB transmission can also be applied to optical communications. SSB optical transmitters are beneficial to long distance optical communications systems because the impact of chromatic dispersion is substantially reduced in comparison to double sideband (DSB) optical transmitters so that high bit rate communications are possible without the need for dispersion compensating optical fiber.

SSB modulation of optical signals is realized through a variety of methods. In one example, a complex arrangement of multiple modulators is used to generate SSB optical signals, see Shimotsu et al., "Development of Optical SSB Modulator," Sumitomo Osaka Cement Co., Ltd., Technical Report 2001, pp. 4-7, http://www.socnb.com/report/ptech_e/2001p06_e.pdf. In another example, multiple drive signals are used to control a single modulator in an SSB transmitter, see U.S. Pat. No. 5,239,401 to Olshansky. However, such systems are typically expensive and require complex feedback systems.

SSB optical signals can also be generated by applying a current modulated data signal to the gain module of a semiconductor laser and intensity modulating the resulting laser output beam as disclosed in U.S. Pat. No. 5,999,300 to Davies et al. However, the current modulated data signal according to this technique also imparts an unwanted intensity modulation to the laser output beam emitted by the semiconductor laser, resulting in incomplete cancellation of one sideband. Consequently, the performance of optical communications systems employing transmitters using this technique is limited.

SUMMARY OF THE INVENTION

In one aspect, the invention features a method for generating an SSB optical signal. A data signal is generated at a first power level and at a second power level. The first and second power levels have a predetermined ratio. The data signal at the first power level is applied to a phase module in a laser cavity of a semiconductor laser to generate a frequency modulated laser signal having a double sideband. The intensity of the frequency modulated laser signal is modulated in response to the data signal at the second power level to generate the SSB optical signal.

In another aspect, the invention features an optical transmitter for generating an SSB optical signal. The optical transmitter includes a laser cavity, an intensity modulator and a data signal network. The laser cavity includes a semiconductor gain module and a phase module in optical communication. The phase module causes a frequency modulated laser signal to be emitted from the laser cavity in response to a first data signal at a first power level. The intensity modulator is in optical communication with the laser cavity and receives the frequency modulated laser signal. An intensity modulation of the frequency modulated laser signal is provided by the intensity modulator in response to a second data signal at a second power level. The data signal network is in electrical communication with the phase module and the intensity modulator. The data signal network generates the first and second data signals at a predetermined ratio of the first and second power levels and at a predetermined relative phase to cause a cancellation of a sideband of the frequency modulated laser signal and a respective sideband induced by the intensity modulation. The resulting optical signal transmitted from the intensity modulator is the single sideband optical signal.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview the present invention relates to an optical transmitter for generating an SSB optical signal. A semiconductor laser and an intensity modulator are integrated in a single transmitter device. The semiconductor laser includes an integral phase module for generating a frequency modulated optical signal. The SSB optical transmitter of the invention has fewer components than other transmitters used to generate SSB optical signals and, therefore, has an increased manufacturing yield and reliability, a lower fabrication cost and a decreased size. Communication networks can be upgraded for higher data rates by replacing existing optical sources with the SSB optical transmitter of the invention without the need to modify or replace other physical infrastructure. Moreover, the maximum allowable distance between the optical source and its receiver can be more than doubled and in some instances can exceed the maximum allowable distance of DSB optical transmitters by a factor of five or more. Alternatively, the power of the SSB optical signal can be decreased relative to the power of the DSB optical signal for a fixed source and receiver separation.

Figure 1:
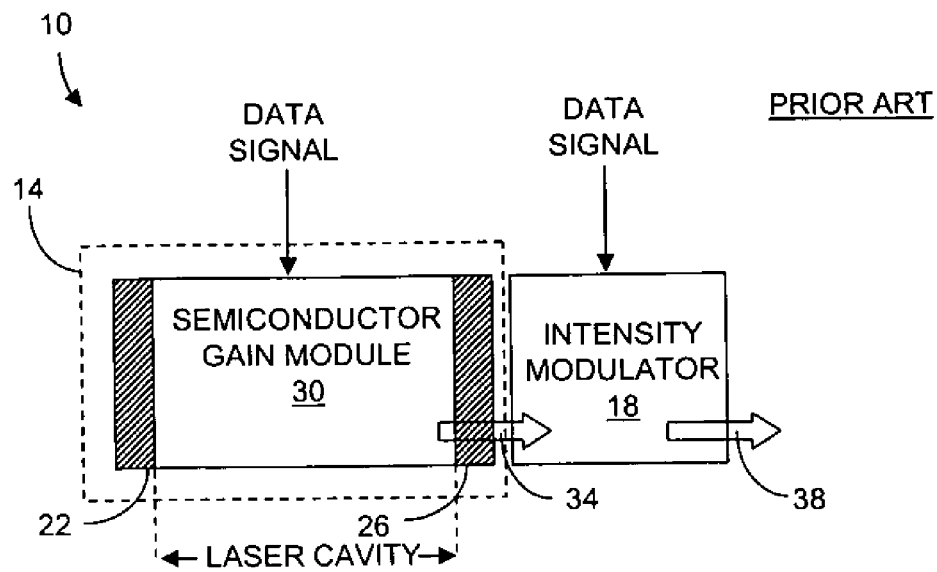
FIG. 1 is a block diagram of an SSB optical transmitter based on applying data signals to a gain module of a semiconductor laser and an intensity modulator.

FIG. 1 illustrates a known SSB optical transmitter 10 having a semiconductor laser 14 and an intensity modulator 18 used to generate optical signals with reduced energy in one sideband. The semiconductor laser 14 includes a laser cavity defined by a back mirror (or reflective surface) 22 and an output mirror (or reflective surface) 26, and a semiconductor gain module 30 between the mirrors 22, 26. An example of such an SSB transmitter used for SSB optical signal generation is disclosed in U.S. Pat. No. 5,999,300 to Davies et al. A frequency modulated output beam 34 is generated by applying a current-modulated data signal to the semiconductor gain module 30. A data signal is also applied to the intensity modulator 18 to impart an intensity modulation to the frequency modulated output beam 34 and consequently generate an SSB optical signal 38. Because the current-modulated data signal applied to the semiconductor gain module 30 also causes an unwanted intensity modulation in the frequency modulated output beam 34, the cancellation of one sideband is incomplete. Consequently, the performance of an optical communication system in which the SSB optical transmitter 10 is employed is limited.

Figure 2:
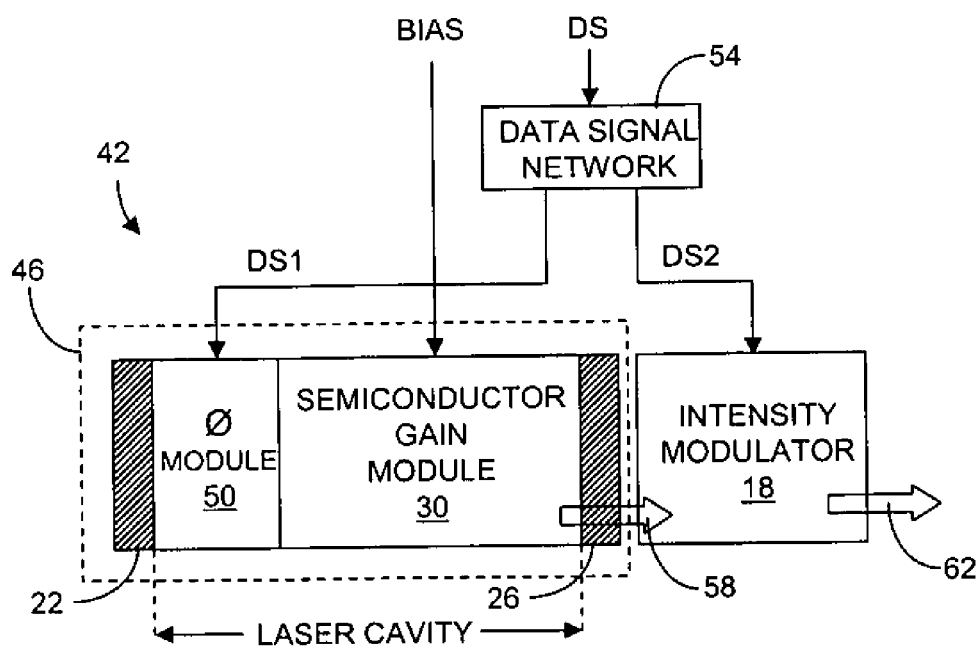
FIG. 2 is a block diagram of an embodiment of an SSB optical transmitter in accordance with the invention.

FIG. 2 illustrates an embodiment of an SSB optical transmitter 42 constructed according to principles of the invention. The transmitter 42 includes a semiconductor laser 46 having a semiconductor gain module 30 and a phase module 50 disposed in the laser cavity defined between the two mirrors 22, 26. The semiconductor laser 46 can be a distributed feedback (DFB) laser, a Fabry-Perot laser or generally any single-frequency semiconductor laser. The phase module 50 can be an electro-optic modulator having an index of refraction that varies according to an applied voltage. The transmitter 42 also includes an external intensity modulator 18 arranged to receive a laser signal 58 emitted from the semiconductor laser 46. The intensity modulator 18 can be, for example, an electro-absorption modulator or a Mach-Zehnder type modulator. An example of a commercially available monolithic device including these components is tunable laser transmitter model no. 4245, manufactured by Agility Communications, Inc. of Santa Barbara, Calif., in which the intensity modulator 18 is an electro-absorption modulator. The transmitter 42 also includes a data signal network 54 in electrical communication with a data source (not shown), the intensity modulator 18 and the phase module 50.

In operation, a bias current is applied to the gain module 30 to generate the laser signal 58 with a substantially constant optical intensity. The data signal network 34 provides a first data signal DS1 and a second data signal DS2 in response to a high bit rate (e.g., 1 Gbps or greater) electrical data signal DS. The first data signal DS1 and the second data signal DS2 are binary voltage level signals. In other embodiments not described herein, the data signals DS, DS1 and DS2 are analog signals used for optical analog transmission. Although the data signals DS1, DS2 generally have different power levels, each represents the same binary information present in the data signal DS received at the data signal network 54. The ratio of the data signal power levels is set at a predetermined value as described below. The first data signal DS1 is applied to the phase module 50. As the signal level (e.g., voltage) varies, the index of refraction of the phase module 50 changes, causing the optical path length of the laser cavity to change. Consequently, the optical frequency of the laser signal 58 is modulated without introducing any unwanted intensity modulation to the laser signal 58. The second data signal DS2 is applied to the intensity modulator 18 so that an intensity modulation is imparted on the frequency modulated laser signal 58 received from the semiconductor laser 46.

Signal delays due to the separate paths of the two data signals DS1, DS2 are substantially equal and act synchronously. More specifically, the electrical delay of the first data signal DS1 due to the transmission path from the data signal network 54 to the phase module 50 plus the optical delay of the frequency modulated laser signal due to the optical path from the phase module 50 to the intensity modulator 18 is matched to the electrical delay of the second data signal DS2 due to the transmission path from the data signal network 54 to the intensity modulator 18.

A relative phase of approximately 90° is maintained between the data signal DS1 applied to the phase module 50 and the data signal DS2 applied to the intensity modulator 18. As a result, a relative phase difference of approximately 180° exists between one sideband of the frequency modulated laser signal 58 and a corresponding sideband induced by the intensity modulation.

Importantly, the data signal network 54 maintains the same amplitude and phase characteristics across the data bandwidth to achieve high performance SSB operation, i.e., the substantial reduction or elimination of one sideband. To operate at high data rates (e.g., greater than 1 Gbps), engineering development may be required to ensure adequate SSB operation. Similarly, the manufacturing process for the semiconductor laser device 46 may require modification to accommodate higher data rates. For example, the frequency roll-off of the phase module 50 should be accurately matched to the frequency roll-off of the intensity modulator 18.

To achieve the desired 180° shift, the signal lines for conducting the data signals DS1, DS2 differ in length by approximately 90°, i.e., ¼ of the characteristic wavelength (e.g., a center frequency) of the data signals DS1, DS2. By maintaining the predetermined power level ratio and phase control, equal modulation sideband amplitudes are realized for the frequency modulated laser signal 58 and the sidebands introduced by the intensity modulator 18. Thus, equal amplitude sidebands having the 180° phase difference can be combined to substantially cancel each other while the sidebands on the other side of the carrier frequency are constructively combined.

Figure 3:
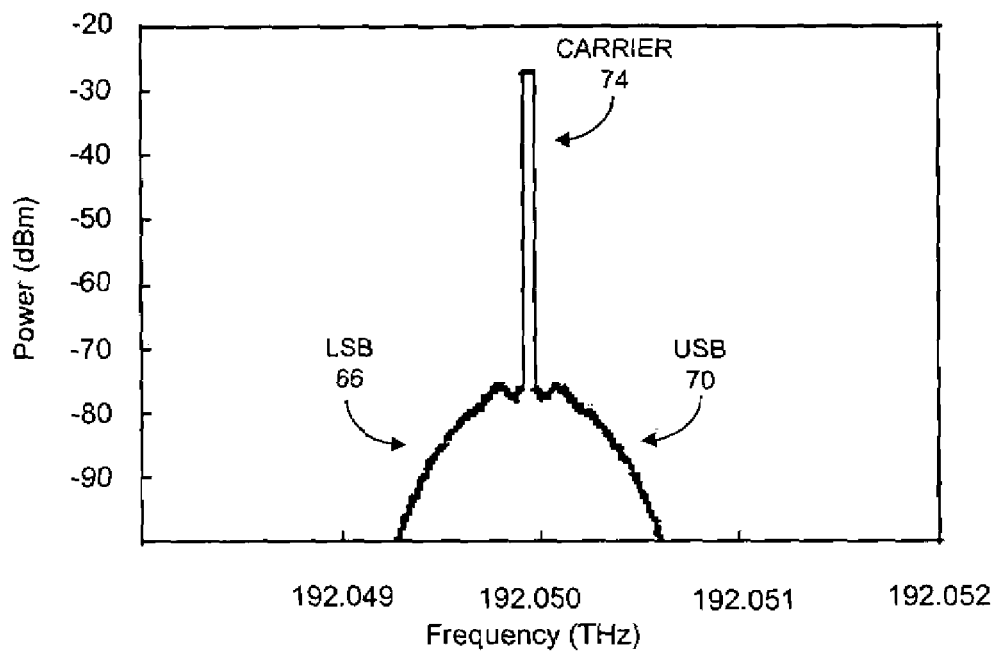
FIG. 3 is a graphical representation of a DSB spectrum resulting from modulation using only the intensity modulator of FIG. 2.

FIG. 3 depicts a simulation of a DSB spectrum resulting from modulation using only the intensity modulator 18 of FIG. 2. That is, the data signal DS2 is applied to the intensity modulator 18 but the data signal DS1 is not applied to the phase module 50. The data signal DS2 in this example is a 1.0 Gbps pseudo-random binary sequence electrical signal in non-return-to-zero (NRZ) modulation format. The symmetrical DSB spectrum shows identical lower and upper sidebands LSB 66 and USB 70, respectively, centered about a 192.05 THz optical carrier 74.

Figure 4:
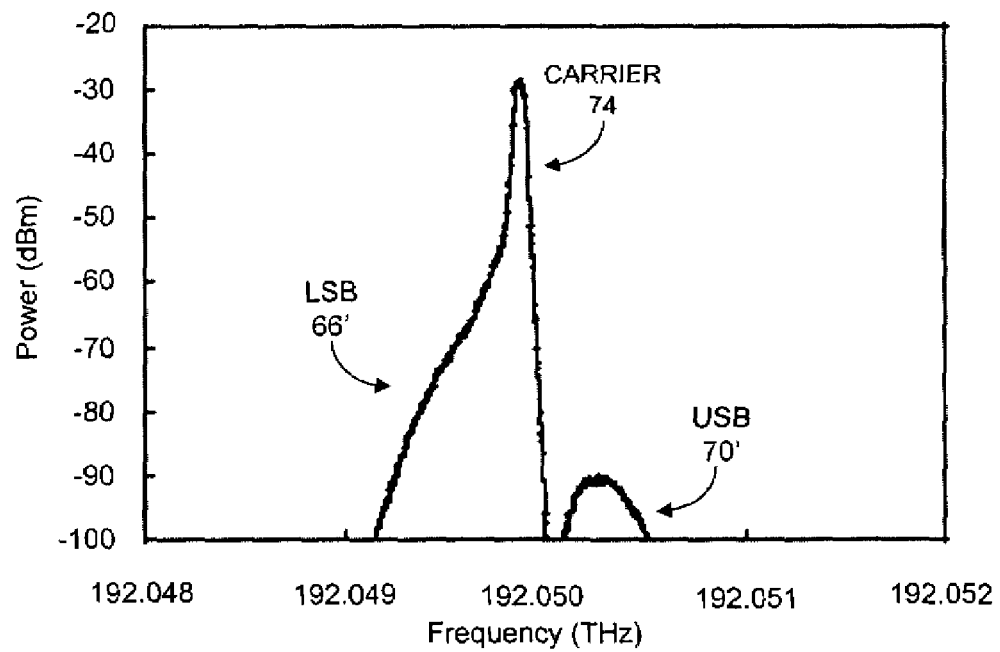
FIG. 4 is a graphical representation of the optical spectrum of the SSB optical signal generated by the SSB optical transmitter of FIG. 2 using both frequency modulation and intensity.

FIG. 4 depicts a simulation of a DSB spectrum due to frequency modulation caused by the phase module 50 and intensity modulation imparted by the intensity modulator 18. In this simulation, the data signal DS1 is applied to the phase module 50 at the appropriate power level relative to the power level of the other data signal DS2 to achieve equal modulation sideband amplitudes. In addition, the desired phase difference of ¼ of the characteristic wavelength of the data signal DS is maintained. The power in the lower sideband LSB 66' is increased by approximately 3 dB relative to the lower sideband LSB 66 shown in FIG. 3. In addition, the power in the upper sideband USB 70' is decreased relative to the upper sideband USB 70 of FIG. 3.

Figure 5:
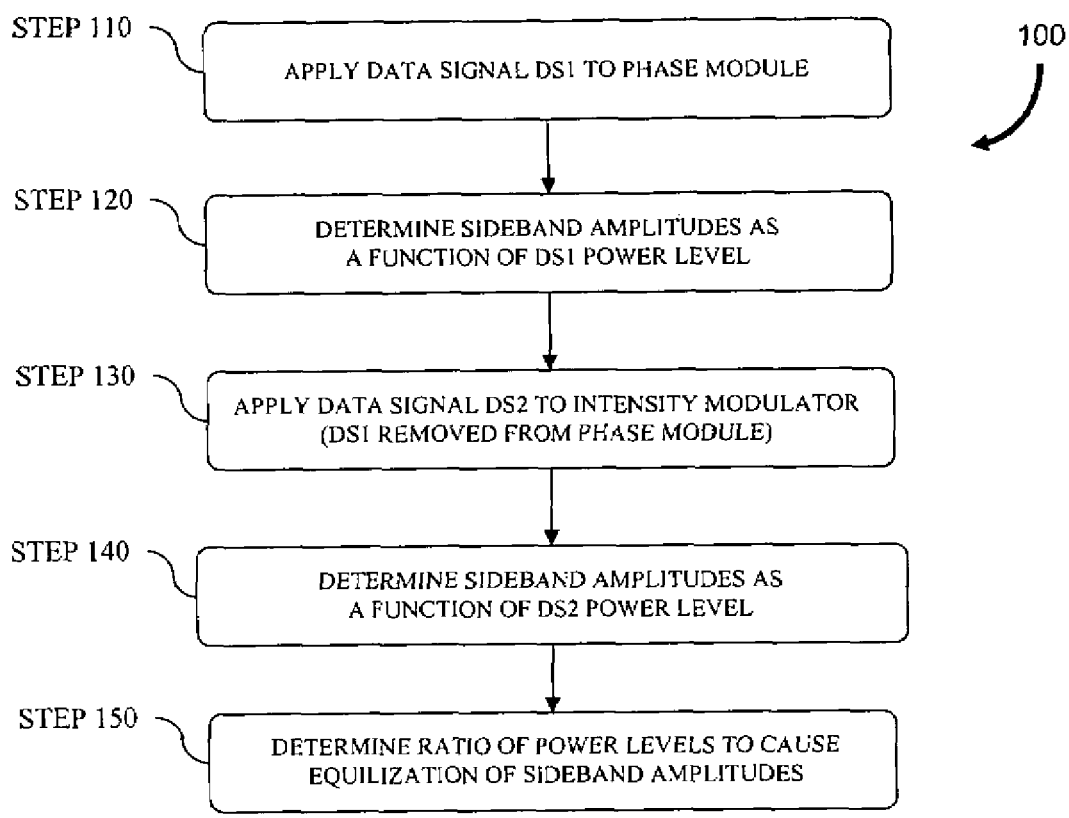
FIG. 5 is a flowchart representation of a process for determining the ratio of the power levels of data signals used to generate the SSB optical signal for the SSB optical transmitter of FIG. 2.

FIG. 5 shows a flowchart describing a process 100 for determining the ratio of the power levels of the data signals DS1, DS2 used to generate the SSB optical signal 62 for the SSB optical transmitter 42 of FIG. 2. One data signal DS1 is applied (step 110) to the phase module 50 of the semiconductor laser 46 to generate a frequency modulated laser signal 58 having a DSB optical spectrum. The power level of the data signal DS1 is varied while the frequency modulated laser signal 58 is monitored by an optical spectrum analyzer to determine (step 120) the sideband amplitudes. The data signal DS1 is removed from the phase module 50 and applied (step 130) (as data signal DS2) to the intensity modulator 18 to generate an intensity modulated laser signal having a DSB optical spectrum. The power level of the data signal DS2 is adjusted while the intensity modulated laser signal is monitored by the optical spectrum analyzer to determine (step 140) sideband amplitudes. Using the information acquired in steps 120 and 140, the ratio of the power levels for the data signals DS1 and DS2 is determined (step 150) for optimized SSB operation. This ratio is a constant for a wide range of power levels. The information obtained according to the method 100 can be applied to the design of the microwave paths in and from the data signal network 54 to obtain the appropriate relative sideband amplitudes.

In an alternative method for determining the ratio of power levels, data signals DS1 and DS2 are applied concurrently to the phase module 50 and the intensity modulator 18. Using a spectrum analyzer, the optical spectrum of the SSB optical signal 62 is observed. One of the power levels is maintained at a constant value while the other power level is adjusted to find a minimum power in one of the sidebands of the SSB optical signal 62. In another method, the ratio of power levels is determined from product or device specifications. For example, the ratio of the power levels can be determined from specifications for the phase module 50 and the intensity modulator 18. In a more detailed example, the frequency change per unit signal change for the data signal DS1 applied to the phase module 50 and the intensity change per unit signal change for the data signal DS2 applied to the intensity modulator 18 are used to determine the ratio of power levels.

While the invention has been shown and described with reference to specific embodiments, it should be understood by those skilled in the art that various changes in form and detail may be made therein without departing from the spirit and scope of the invention.

What is claimed is:

1. A method for generating a single sideband optical signal, the method comprising:
    generating a data signal at a first power level and at a second power level, the first and the second power levels having a predetermined ratio;
    applying the data signal at the first power level to a phase module in a semiconductor laser to generate a frequency modulated laser signal having a double sideband, the phase module being disposed in a laser cavity of the semiconductor laser; and
    modulating the intensity of the frequency modulated laser signal in response to the data signal at the second power level to generate the single sideband optical signal.

2. The method of claim 1 wherein the step of modulating the intensity of the frequency modulated laser signal comprises applying the data signal at the second power level to an external intensity modulator.

3. An optical transmitter for generating a single sideband optical signal, comprising:
    a laser cavity comprising:
        a semiconductor gain module; and
        a phase module in optical communication with the semiconductor gain module, the phase module causing a frequency modulated laser signal to be emitted from the laser cavity in response to a first data signal at a first power level;
    an intensity modulator in optical communication with the laser cavity to receive the frequency modulated laser signal, the intensity modulator providing an intensity modulation of the frequency modulated laser signal in response to a second data signal at a second power level; and
    a data signal network in electrical communication with the phase module and the intensity modulator, the data signal network generating the first and the second data signals at a predetermined ratio of the first and second power levels and at a predetermined relative phase to cause a cancellation of a sideband of the frequency modulated laser signal and a respective sideband induced by the intensity modulation, wherein an optical signal transmitted from the intensity modulator is the single sideband optical signal.

4. The optical transmitter of claim 3 wherein the first data signal and the second data signal comprise the same data.

5. The optical transmitter of claim 3 wherein the intensity modulator is a Mach-Zehnder modulator.

6. The optical transmitter of claim 3 wherein the intensity modulator is an electro-absorption modulator.

7. The optical transmitter of claim 3 wherein the laser cavity is part of a distributed feedback laser.

8. The optical transmitter of claim 3 wherein the laser cavity is part of a Fabry-Perot laser.

9. The optical transmitter of claim 3 further comprising a signal line having a first length to conduct the first data signal to the phase module and a signal line having a second length to conduct the second data signal to the intensity modulator, a difference between the first and second lengths causing the phase of the data signal at the phase module and at the intensity modulator to differ by 90°.

10. The optical transmitter of claim 3 wherein the phase module comprises an electro-optic element having a voltage-dependent index of refraction.

* * * * *

UNITED STATES PATENT AND TRADEMARK OFFICE
CERTIFICATE OF CORRECTION

| | | |
|---|---|---|
| PATENT NO. | : 7,324,761 B2 | Page 1 of 1 |
| APPLICATION NO. | : 11/038989 | |
| DATED | : January 29, 2008 | |
| INVENTOR(S) | : Schulz et al. | |

It is certified that error appears in the above-identified patent and that said Letters Patent is hereby corrected as shown below:

In column 1, delete the entire paragraph that starts at line 6 and ends at line 9.

In column 1, insert the following paragraph at line 6:

--This invention was made with government support under Grant No. F19628-00-C-0002 awarded by the U.S. Air Force. The government has certain rights in this invention.--

Signed and Sealed this

Seventeenth Day of May, 2011

David J. Kappos
*Director of the United States Patent and Trademark Office*